United States Patent
Wang et al.

(10) Patent No.: US 8,595,860 B2
(45) Date of Patent: Nov. 26, 2013

(54) METHOD OF FABRICATING A PROBE DEVICE FOR A METROLOGY INSTRUMENT AND A PROBE DEVICE PRODUCED THEREBY

(75) Inventors: Weijie Wang, Newbury Park, CA (US); Steven Nagle, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 394 days.

(21) Appl. No.: 12/345,465

(22) Filed: Dec. 29, 2008

(65) Prior Publication Data

US 2009/0205092 A1  Aug. 13, 2009

Related U.S. Application Data

(60) Provisional application No. 61/017,434, filed on Dec. 28, 2007.

(51) Int. Cl.
    *G12B 21/08*  (2006.01)
(52) U.S. Cl.
    USPC ............................. 850/40; 850/58; 250/306
(58) Field of Classification Search
    USPC ........................................................ 850/40
    See application file for complete search history.

(56) References Cited

U.S. PATENT DOCUMENTS

| | | | |
|---|---|---|---|
| 5,051,379 A * | 9/1991 | Bayer et al. | 216/2 |
| 5,266,801 A | 11/1993 | Elings et al. | |
| RE34,489 E | 12/1993 | Hansma et al. | |
| 5,412,980 A | 5/1995 | Elings et al. | |
| 5,708,267 A * | 1/1998 | Hatakeyama | 250/251 |
| 6,780,664 B1 | 8/2004 | Goruganthu et al. | |
| 6,864,481 B2 * | 3/2005 | Kaito et al. | 250/306 |
| 6,918,286 B2 | 7/2005 | Kitazawa et al. | |
| 7,011,884 B1 | 3/2006 | Chow et al. | |
| 7,386,934 B2 * | 6/2008 | Dugas et al. | 29/603.16 |
| 7,578,176 B2 * | 8/2009 | Bao et al. | 73/105 |
| 2003/0143327 A1 | 7/2003 | Schlaf et al. | |
| 2009/0106869 A1 | 4/2009 | Park et al. | |

* cited by examiner

*Primary Examiner* — Phillip A Johnston
(74) *Attorney, Agent, or Firm* — Boyle Fredrickson, S.C.

(57) ABSTRACT

A method of producing a probe device for a metrology instrument such as an AFM includes providing a substrate and forming a tip stock extending upwardly from the substrate. The tip stock is preferably FIB milled to form a tip of the probe device. The tip preferably has a high aspect ratio, with a height that is at least about 1 micron for performing critical dimension (e.g., deep trench) atomic force microscopy. The stock is preferably pedestal shaped having a distal end that is substantially planar which can be machined into a tip in at least less than about 2 minutes. With the preferred embodiments, the FIB milling step can be completed in substantially fewer and less complicated steps than known techniques to produce a high aspect ratio tip suitable for DT-AFM in less than about one minute.

24 Claims, 6 Drawing Sheets

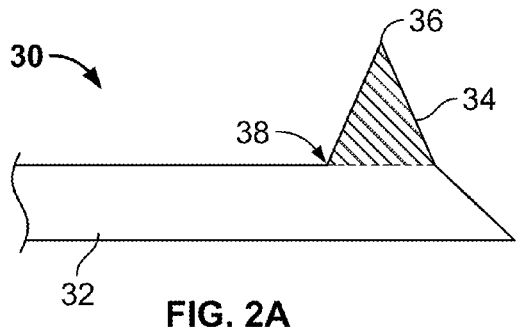
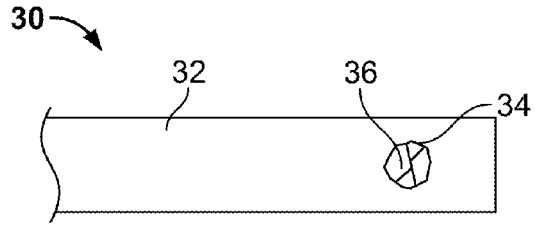
FIG. 2A
Prior Art
FIG. 2B
Prior Art
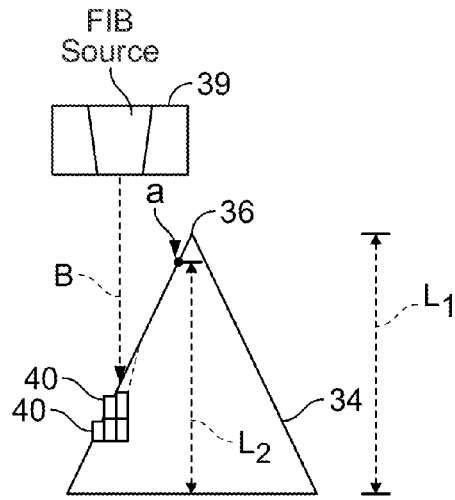
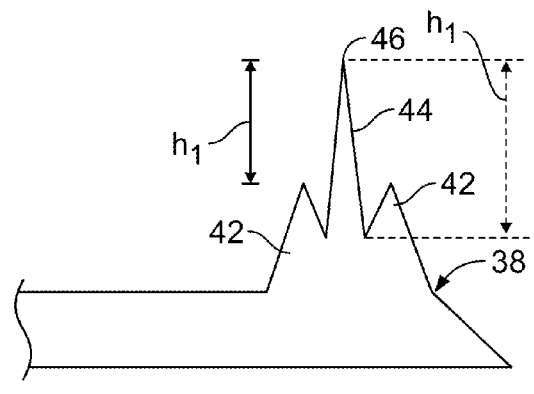
FIG. 3A
Prior Art
FIG. 3B
Prior Art
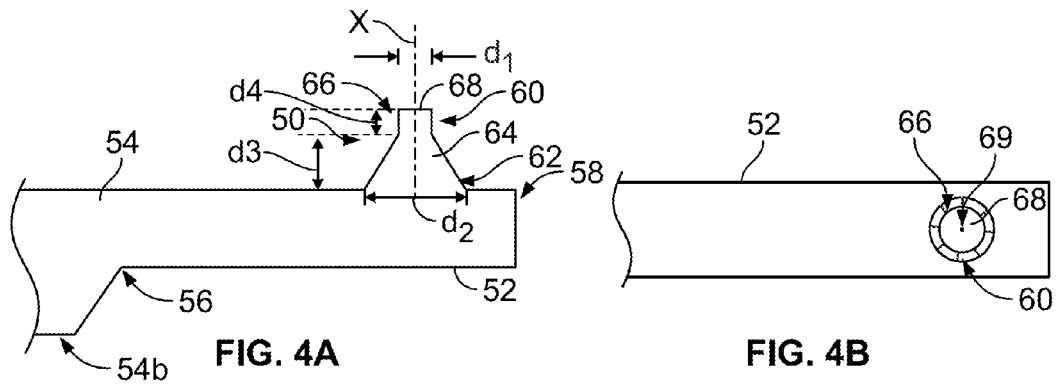
FIG. 4A
FIG. 4B

METHOD OF FABRICATING A PROBE DEVICE FOR A METROLOGY INSTRUMENT AND A PROBE DEVICE PRODUCED THEREBY

BACKGROUND OF THE INVENTION

1. Field of the Invention

The preferred embodiments are directed to probe devices for metrology instruments such as atomic force microscopes, and more specifically a method of producing a probe device using focused ion beam (FIB) etching, as well as a probe device produced thereby.

2. Discussion of the Prior Art

Several probe-based metrology instruments monitor the interaction between a cantilever-based probe and a sample to obtain information concerning one or more characteristics of the sample. For example, scanning probe microscopes (SPMs), including atomic force microscopes (AFMs), typically characterize the surface of a sample down to atomic dimensions by monitoring the interaction between the sample and a tip on the cantilever probe. By providing relative scanning movement between the tip and the sample, surface characteristic data can be acquired over a particular region of the sample, and a corresponding map of the sample can be generated.

The probe of the typical AFM includes a very small cantilever which is fixed to a support at its base and which has a sharp probe tip attached to the opposite, free end. The probe tip is brought very near to or into contact with a surface of a sample to be examined, and the deflection of the cantilever in response to the probe tip's interaction with the sample is measured with a deflection detector, such as an optical lever system, an example of which is described in Hansma et al. U.S. Pat. No. RE 34,489. The probe is scanned over a surface using a high-resolution three axis scanner acting on the sample support and/or the probe. The instrument is thus capable of creating relative motion between the probe and the sample while measuring the topography, elasticity, or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

AFMs may be designed to operate in a variety of modes, including contact mode and oscillating mode. In contact mode operation, the microscope typically scans the tip across the surface of the sample while keeping the force of the tip on the surface of the sample generally constant. This effect is accomplished by moving either the sample or the probe assembly vertically to the surface of the sample in response to sensed deflection of the cantilever as the probe is scanned horizontally across the surface. In this way, the data associated with this vertical motion can be stored and then used to construct an image of the sample surface corresponding to the sample characteristic being measured, e.g., surface topography. Alternatively, some AFMs can at least selectively operate in an oscillation mode of operation such as TappingMode™ operation. (TappingMode is a trademark of Veeco Instruments, Inc.) In TappingMode™ operation the tip is oscillated, typically at or near a resonant frequency of the cantilever of the probe. The amplitude or phase of this oscillation is kept constant during scanning using feedback signals, which are generated in response to tip-sample interaction. As in contact mode, these feedback signals are then collected, stored, and used as data to characterize the sample.

Regardless of their mode of operation, AFMs can obtain resolution down to the atomic level on a wide variety of insulating or conductive surfaces in air, liquid or vacuum by using piezoelectric scanners, optical lever deflection detectors, and very small cantilevers fabricated using photolithographic techniques. Because of their resolution and versatility, AFMs are particularly important measurement devices in many diverse fields including with particular application in connection with the present preferred embodiments semiconductor manufacturing.

A scanning probe microscope, such as an atomic force microscope (AFM) operates by providing relative scanning movement between a measuring probe and a sample while measuring one or more properties of the sample. A typical AFM system is shown schematically in FIG. 1. An AFM 10 employing a probe device 12 including a probe 14 having a cantilever 15 is coupled to an oscillating actuator or drive 16 that is used to drive probe 14, in this case, at or near the probe's resonant frequency. Commonly, an electronic signal is applied from an AC signal source 18 under control of an AFM controller 20 to cause actuator 16 to drive the probe 14 to oscillate, preferably at a free oscillation amplitude $A_o$. Probe 14 is typically actuated toward and away from sample 22 using a suitable actuator or scanner 24 controlled via feedback by controller 20. Notably, the actuator 16 may be coupled to the scanner 24 and probe 14 but may be formed integrally with the cantilever 15 of probe 14 as part of a self-actuated cantilever/probe. Moreover, though the actuator 24 is shown coupled to the probe 14, the actuator 24 may be employed to move sample 22 in three orthogonal directions as an XYZ actuator, i.e., both Z motion, and X-Y scanning motion such as in raster scanning.

Typically, a selected probe 14 is oscillated and brought into contact with sample 22 as sample characteristics are monitored by detecting changes in one or more characteristics of the oscillation of probe 14, as described above. In this regard, a deflection detection apparatus 17 is typically employed to direct a beam towards the backside of probe 14, the beam then being reflected towards a detector 26, such as a four quadrant photodetector. As the beam translates across detector 26, appropriate signals are transmitted to controller 20, which processes the signals to move actuator 24 in Z appropriately (and possibly indicate changes in the oscillation of probe 14). Commonly, controller 20 (such as an analog or digital P-I controller) generates control signals to maintain a constant force between the tip and sample, typically to maintain a setpoint characteristic of the oscillation of probe 14. For example, controller 20 is often used to maintain the oscillation amplitude at a setpoint value, $A_S$, to insure a generally constant force between the tip and sample (by using actuator 24 to move either the probe or sample in Z). Alternatively, a setpoint phase or frequency may be used.

At present, the broadening use of SPM has demanded greater performance over a wider range of applications. For example, AFM metrology is increasingly being utilized in semiconductor fabrication facilities, primarily due to recent developments of automated AFM tools able to acquire sample measurements with higher throughput, such as the Dimension® line of AFMs offered by Veeco Instruments Inc. These tools are able to provide a variety of sub-nanoscale measurements, therefore making AFM a viable tool for measuring, for example, "critical dimensions" of device features such as trenches and vias.

One challenge in imaging semiconductor samples with an AFM is that such samples have features having large aspect ratios, for example, 50:1, and more, generally 10:1, and at least 3:1. Although the apex or distal end of the AFM probe device tip is typically nanometer-scale, it is often difficult or impossible to generate probe tip-sample interaction sufficient to reliably image features such as trenches and vias that have very high aspect ratios. In sum, given the mechanical interaction between the tip of the probe and the sample surface, performing measurements on such features can be particularly challenging with SPMs.

One solution is to form the tip of the probes with a similarly high aspect ratio (for example 20:1), shown in the prior art probe of FIG. 10. One known technique for producing such high aspect ratio probe devices includes using a process employing a focused ion beam (FIB) to mill away tip stock material. FIG. 10 illustrates an FIB milled tip. The resulting tip is on the order of 4 μm long with an aspect ratio of 25:1. In this case, the tip is milled from a semiconductor material that was initially microfabricated into a pyramid-shaped tip stock using conventional semiconductor fabrication techniques, including an anisotropic etch that yields the faceted (e.g., pyramid-shaped) tip stock.

FIG. 2A illustrates a schematic cross-section of a standard pyramid-shaped tip stock 34 formed to extend from a cantilever 32 of a probe device 30 according to a conventional technique described generally hereinafter. Starting with a wafer (e.g., silicon), tip stocks 34 associated with an array of probe devices are batch fabricated from the wafer for later FIB milling of the tips. About 350 to 450 probe devices typically will be included in the array, and in some situations, multiple wafers can be milled using a single machine. This process is typically performed with an anisotropic etch that yields tip stocks having the aforementioned pyramidal shape, including an apex 36 and a base 38. Once the tip stocks 34 are formed, ion beam milling can be performed to produce a high aspect ratio tip including a spike, for each probe device. The widths of the spike are about 80 and 170 nm respectively when measured at 2 μm and 4 μm height from the new apex on the FIB-milled tip. Each tip stock 34 is milled individually until the entire wafer is processed into probe devices 30.

With reference to FIG. 2B, one challenge with known FIB milling techniques is referencing the FIB source to apex 36 of the pyramid-shaped tip stock 34 when initiating the milling operation and the complications of "rubble" (see FIG. 2C) that always exists around the base. As noted earlier, this apex typically has a nanometer-sized dimension and its shape is highly variable, and thus is difficult to identify, even with sophisticated pattern recognition software (see FIG. 2B). When performing an FIB milling operation, if the source is not aligned with apex 36, more of tip stock 34 will typically need to be milled away to create the tip, and the shape of the resultant spike will not be optimal. More particularly, as the milling pattern is shifted relative to the original apex, the length of the resultant spike compared to the side lobes at each pyramid corner changes dramatically. In that case, the aspect ratio of the resultant tip may be less than theoretically possible because the apex of the stock (defining the point of the potentially largest height of the tip) is no longer present. Moreover, milling more material to produce the tip also requires a greater number of milling steps (described further below), and correspondingly more time to form the tips.

This alignment challenge also renders it even more difficult to produce a high aspect ratio tip considering that the tip is formed at an angle relative to the cantilever. This is so because, as understood in the art, the tip most often extends orthogonally to a plane substantially defined by the sample surface. Because the probe (i.e., cantilever) typically extends at an angle to the surface during AFM operation, the probe most often is fabricated to extend at an angle relative to the cantilever (typically 3° or 12°). With this background and noting that the complex pyramidal shape is hard to track as it is oriented at angle to the beam, a non-ideal tip often results (for example, milling may begin at point "a" which could result in milling too much of the tip stock, shown schematically in FIG. 3A, and discussed further below).

The pyramidal shape of the tip stock also complicates the FIB milling operation because large volumes of the sloped surfaces 35 extending from apex 36 to the base 38 of the tip stock 34 cannot be milled in one step; rather, a complex algorithm to control the FIB source, for example, to track the slope of the tip stock surfaces to be milled is required. More particularly, turning to FIG. 3A, in a typical FIB milling operation, an FIB source 39 is instructed to mill portions of a tip stock 34 by controlling the location, ion beam current, area, and dwell time of a ion beam "B." Because the pyramid-shaped stock has sloped surfaces, the overhead focused ion beam must spend differing amounts of time at each point on the slope to yield a resultant flat surface around the spike, i.e., there is non-uniformity in the thickness or height of the tip stock from the base. Most typically, as a result, and as shown in FIG. 3A, the control algorithm directs the beam to mill individual cylinders, anywhere from 5 to 100 μm in diameter, of the stock at a particular location/power, thereby "whittling" the stock down. These steps are organized into rectangular or circular groups referred to as mask 40. This is done in a series of patterned steps to create, for example, the sharp barb shown in FIG. 10, and shown schematically in FIG. 3B. In sum, each mask 40 constitutes a relatively small portion of the entire milled volume of the probe tip 44 such that often hundreds of masks corresponding to FIB process steps that are required to mill the tip, steps that again are controlled by a complicated control algorithm that must be developed by the manufacturer of the probe. In the end, each tip associated with each probe can take as long as 5 or more minutes to produce.

In addition, the sharp barb 44, and particularly apex 46, operates as the "active portion" of the tip, i.e., the portion that operatively interacts with the sample during the imaging process. With reference to FIG. 3B, the active portion of barb 44 has a height "$h_1$," even though the barb has an actual height "$h_2$." As shown, the active portion of barb 44 is limited by the imperfect milling process of a pyramidal-shaped starting stock, leaving residual portions 42 having a height extending above the bottom or base of barb 44. It is the difference between $h_1$ and $h_2$, which depends greatly on the shape of the starting stock that makes milling with current techniques particularly difficult. In other words, more milling must generally be done with inconsistently shaped tip stocks to account for variation. In the end, laborious milling was required for fabricating this type of probe and an improvement was desired.

Notably, even if tips may be produced with an active region having the desired aspect ratio, to do so, known processes require that a large tip stock 34 must be formed to enable deep milling to allow corresponding production of high aspect ratio tips. This requirement typically adds to an already large number of FIB milling steps, and also requires that a large volume of tip stock material be removed from the tip. Not only does this add to the inefficiency of known FIB probe fabrication processes, it adds significant mass to the resultant tip, thereby limiting the speed at which the probe devices can operate given the corresponding limited operational resonant frequencies.

Overall, the process of forming the tip such as that shown in FIG. 10 requires a large stock material and a complex algorithm to control the FIB source to mill a high aspect ratio tip. Forming the tip of each probe can take as many as fifty or more individual process steps to ultimately mill a tip stock into a tip such as that shown in FIG. 10, a tip that typically has less than optimal performance characteristics for present high throughput applications, due at least in part to aspect ratio limitations caused by $h_1$ vs. $h_2$.

The field of scanning probe microscopy in general, and essentially critical dimension AFM (CD-AFM), including deep trench AFM (DT-AFM), was thus in need of a new process of forming a probe, preferably using FIB milling to yield a high aspect ratio tip, but doing so with a minimum number of process steps, and with a sufficiently small volume of milled stock material. Preferably, the tip stock would have a shape defining a known volume (rather than a random shape) and would have a relatively uniform height from distal end to base on a tip-to-tip basis. Ideally, FIB milled tips that can be readily recognized and FIB milled in substantially less than 5 minutes while maintaining a high aspect ratio tip was desired.

SUMMARY OF THE INVENTION

By forming a tip stock that is cylinder-shaped and/or cone shaped and of substantially consistent height from the back of the tip stock wafer to the plans of the distal end thereof, the above-noted drawbacks associated with known FIB milling techniques (including using multi-faceted (for example, pyramidal) tip stocks), are substantially overcome. In contrast to known techniques, high aspect ratio tips usable, for example, in DT-AFM or high aspect ratio trench memory applications, can be produced in substantially fewer and less complicated FIB machining steps. Moreover, the yield of usable tips is also improved given the ability to recognize and readily align the distal ends of the probe stocks with the milling source, which also further facilitates speed of probe device production.

According to a first aspect of the preferred embodiment, a method of producing a probe device for a metrology instrument such as an AFM includes providing a substrate and forming a tip stock extending upwardly from the substrate. The method includes FIB milling the tip stock to form a tip of the probe. The resulting tip preferably has a height that is at least about 1 micron and is formed in less than about 5 minutes. Moreover, the distal end of the tip is a well-known distance from the back of the wafer of the stock, within about +/−0.5 μm versus +/−3 μm as with known techniques.

In another aspect of this embodiment, the tip stock is a cylinder distal end on a cone base having a distal end whose top is substantially planar and has a surface area greater than about 1 μm².

In a further aspect of this embodiment, a dimension of a cross-section of the distal end is about the same as a dimension of a cross-section of a base of the pedestal (base may be a cylinder instead of a cone). Preferably, the width of the base is less than about 2 μm. According to yet another aspect of this embodiment, the milling step is completed in less than about 2 minutes, and more preferably, less than about 1 minute.

In a still further aspect of this embodiment, the milling step is completed in less than 20 milling masks, and may be completed using less than three (3) milling masks (even one).

According to another aspect of this preferred embodiment, the forming step is anisotropic and includes using a reactive ion etch (RIE).

According to a still further aspect of this embodiment, the substrate is a silicon wafer and the metrology instrument is an AFM.

In a further aspect of this embodiment, a method of producing a probe for a metrology instrument includes providing a substrate from which a tip stock is formed having a volume of less than about 100 μm³ and FIB milling the tip stock to form a tip of the metrology instrument.

In another aspect of this preferred embodiment, a method of producing a probe for a metrology instrument includes providing a substrate from which a tip stock extending upwardly is formed and FIB milling the tip stock into an SPM tip using less than about twenty machining masks.

According to another aspect of this embodiment, the milling step is completed in less than about three machining masks (as few as one).

According to another preferred embodiment, a method of producing a probe for a metrology instrument includes providing a substrate from which a tip stock having a substantially flat distal end is formed. The method also includes more easily identifying a distal end of the tip stock with a pattern recognition algorithm and FIB milling the tip stock into an SPM tip because the stock distal end is flat, a known distance from the machine reference plane and consistent from tip-stock to tip-stock across the stock wafer.

According to another aspect of this preferred embodiment, the method includes tilting at least one of the probe and the FIB source to accommodate mounting the probe at an angle relative to the sample surface so that the probe tip extends substantially orthogonally relative to the sample surface when mounted.

In yet another aspect of the preferred embodiment, a probe device for a metrology instrument includes a substrate from which a cantilever having a substantially free end extends. A tip extends substantially orthogonally from about the free end of the cantilever and has an end cross-section shape that is identified within 2 seconds.

According to a still further aspect of the preferred embodiments, a probe device for a metrology instrument includes a substrate from which a cantilever having a substantially free end extends. A tip extends substantially orthogonally from about the free end of the cantilever at least about 500 nm and has a tip base having a cross-sectional diameter less than about 10 μm. In a still further aspect of the preferred embodiments, an aspect ratio of the tip is between about 20 and 40.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 2A is a schematic side illustration of a tip stock used to form the probe of FIG. 1, appropriately labeled "Prior Art";

FIG. 2B is a schematic top view of a prior art probe having a pyramid-shaped tip stock, appropriately labeled "Prior Art";

FIG. 3A is a schematic side elevation view of a tip stock milled according to a prior art FIB milling process, appropriately labeled "Prior Art";

FIG. 3B is a schematic illustration of a resultant probe formed using the process illustrated in FIG. 3A, appropriately labeled "Prior Art";

FIG. 4A is a schematic side elevation view of a tip stock according to a preferred embodiment;

FIG. 4B is a top view of the tip stock shown in FIG. 4A, illustrating the distal end of the tip;

DETAILED DESCRIPTION OF THE PREFERRED EMBODIMENTS

Figure 1:
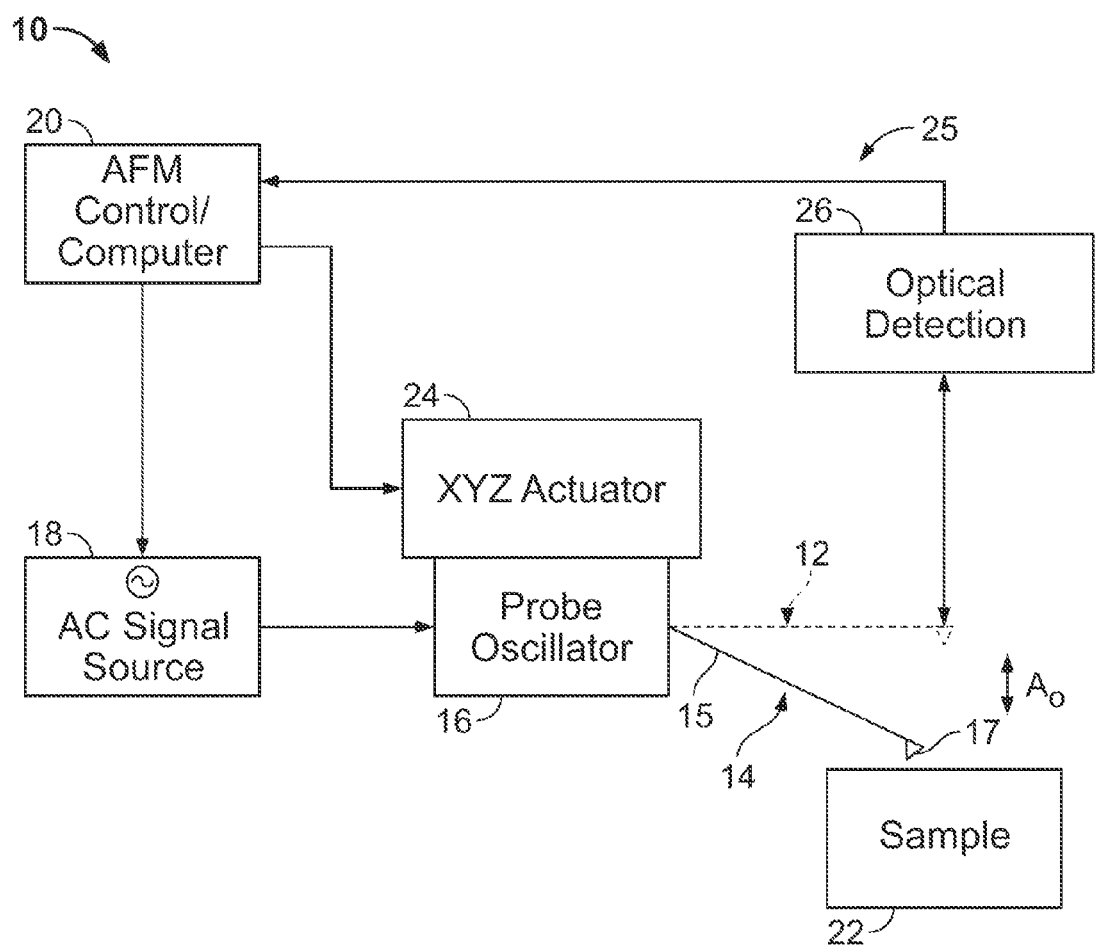
FIG. 1 is a block diagram of a prior art atomic force microscope (AFM), appropriately labeled "Prior Art"

To improve the process with which focused ion beam (FIB) probe devices are produced, the preferred embodiments described herein substantially eliminate complex patterning and milling steps associated with prior methods by utilizing a stock material shaped to facilitate high integrity, high throughput FIB milling. The ability to produce high integrity tips in a relatively short amount of time, including milling substantially less material from the tip stock in fewer process steps, allows the preferred embodiments to produce greater functionality high aspect ratio FIB probe devices (at least 20 to 30, and more preferably, 20 to 40) having improved operational characteristics in a more cost-effective and reliable way than prior methods.

The present FIB milling process which employs a pedestal with a flat distal end (flat cap stock) allows fabrication of a high aspect ratio probe using a silicon substrate. Again, high aspect ratio generally means the height of the tip is far more than the diameter of the tip apex and tip base size. For example, when the tip base diameter is identical to the tip apex diameter and the aspect ratio is 10, the tip shape is essentially a cylinder with the height 10 times more than the tip diameter. Another important feature is the side wall of the tip apex. Normally the etch process can produce a tip half angle (half of the solid angle formed by the tip) that is about 15 degrees. The FIB milling process of the preferred embodiments can produce tip half angle less than 10 degrees. Notably, for a tip having a vertical side wall to the pedestal, the half angle is zero.

Turning to FIG. 4A, a schematic illustration of a probe device 50 fabricated according to a preferred embodiment includes a cantilever 52 extending from a probe body 54 at a fixed end 56 of cantilever 52, the cantilever including a free end 58 generally opposite fixed end 56 that supports a tip stock 60. Stock 60 has a base 62 (which in this case is conical) and a body 64 extending generally orthogonally to cantilever 52 to define a distal end 66. Tip stock 60 preferably is formed lithographically to extend from a surface of a substrate, e.g., a silicon wafer, and more specifically, it may be formed integrally with cantilever 52 and probe body 54 from the wafer, but need not be. Further details of the formation of the tip stock 60 will be described below in connection with FIG. 8.

Once formed, tip stock 60 preferably defines a pedestal. The pedestal may have a substantially cylindrical shape, but it may have a polygonal or other-shaped cross-section. Preferably, the stock 60 is formed so as to yield a stock having a substantially flat surface 68 at its distal end (generally parallel to the cantilever 52—sometimes referred to herein as a flat cap stock), which in this case is substantially circular in cross-section, as shown in FIG. 4B. It is this surface 68 of distal end 66 of tip stock 60 and its larger surface area when compared to the apex of the pyramid-shaped tip stocks used in prior methods (see FIG. 2B) that allows ready machine-vision identification of the initial milling surfaces of the tip stocks of the wafer associated with the probe devices to be produced. And the surface 68 of the distal end 66 is at a well known distance +/−1 μm from the back surface 54b of the probe body 54. As a result, FIB milling is more easily initiated and production time is correspondingly reduced.

Further in this regard, pattern recognition software is preferably used to identify each of the distal ends 66 of the tip stocks 60 of the array of probe devices of the wafer, and thereby control the corresponding FIB milling source to machine the apex of the resultant probe tip from the outermost flat surface 68 of stock 60. This is in contrast to the pyramidal shape of the tip stock used in known FIB milling techniques in which, although an attempt is made to align the FIB beam "B" with the apex 36 of the tip stock 34, it is difficult to identify the nanometer-sized apex 36, even with sophisticated pattern recognition software, as described above. As a result, the system may identify the apex 36 incorrectly as being at, for example, a point "a" on a surface of the pyramid and begin milling as if it were the apex. This results in a milled tip of varying $h_1$ to $h_2$ ratio when using prior techniques, and typically much lower than the one desired because the process must compensate for the error between the actual apex and "a". In addition due to the pyramidal shape and the manner in which FIB milling works the resultant spike will have an elliptical and variable XSCN. Both of these compromise the function of the probe.

With a tip stock 60 such as that shown schematically in FIG. 4A, the preferred embodiments are able to provide a tip that is more readily identifiable given its relatively flat distal end 68, which is comparatively easy to recognize using appropriate pattern recognition software. Typically, the area of distal end ranges between about 300 $nm^2$ and 15 $\mu m^2$. In fact, the end cross-sectional shape can be identified, in the preferred embodiments, within two (2) seconds of initiating the search. This time period can even be less given that once two of the ends are found the system will know where all of the distal ends are in the patterned wafer given the lithography operation, discussed further in connection with FIG. 8.

Moreover, as a result of the pedestal shape of stock 60, the dimension $d_1$ of the distal end 66 of the stock of this preferred embodiment is substantially consistent and of known height $h_4$. The result is that the width or thickness of the tip stock is generally uniform along its central axis "X" between the flat 68 and bottom of the distal end, substantially defining the extent of the milled volume. And, as a result, the volume of stock material that is required for the preferred embodiments is typically 15 $\mu m^3$ to 120 $\mu m^3$, and preferably about 22 $\mu m^3$ to 38 $\mu m^3$. The importance of this feature will be apparent from the below discussion directed to the FIB milling operation of the preferred embodiments.

Figure 5A:
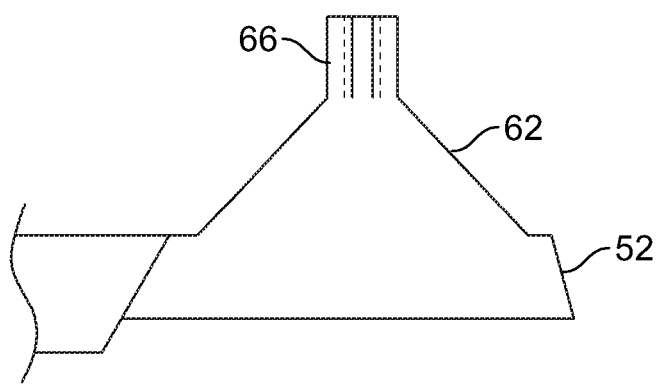
FIG. 5A is a schematic side elevation view of a milling process according to a preferred embodiment.

Turning to FIG. 5A, once a distal end 66 of tip stock 60 is identified, the FIB milling source 70 performs a first milling or machining operation, typically to mill away the tip stock material in a ring 72 about substantially a center 69 of tip stock 60 distal end 66. In this case, the milling operation is about the perimeter (circumference in the case of a cylindrical pedestal) of stock 60 distal end 66. The FIB source or tip stock 60 is preferably inclined at an angle (e.g., 3° or 12°) relative to the vertical so as to produce a tip that extends at a corresponding angle relative to the cantilever 52 (not shown in FIG. 5A but understood in the art). The resulting tip will extend generally vertically relative to the sample when the cantilever 52 is inclined during imaging. Because the thickness or height of stock 60 from face 68 to top of base 62 is substantially uniform along the entire length of the stock distal end 66 (stock top, also called flat cap stock), the first milling operation can machine substantially the entire length of the resultant tip as the beam "B" makes its way around the perimeter of tip stock 60 under suitable control. This is in contrast to the above-described known systems in which only limited depths of material ("sets of patterned cylinders" or masks 40) are milled away from the pyramidal tip stock with each instruction (a multitude of which are required) to mill the tip stock with FIB source 39 (see FIG. 3A).

Figure 5C:
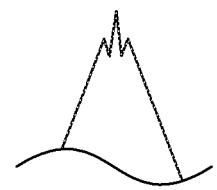
FIG. 5C is a schematic side elevation view of a tip resulting from the FIB milling process illustrated in FIG. 5A.
Figure 5B:
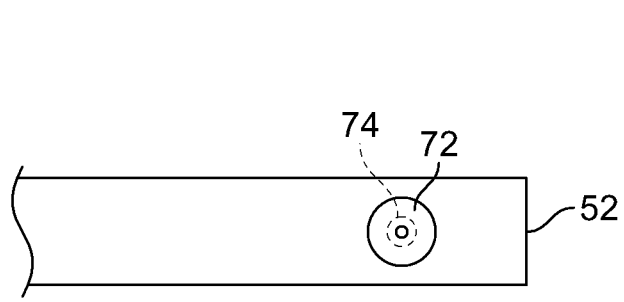
FIG. 5B is a top view of the an FIB milling process further to that illustrated in FIG. 5A.
Figure 5D:
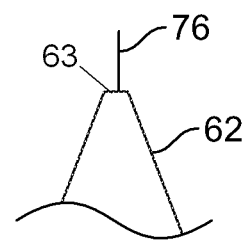
FIG. 5D is a schematic side elevation view of a tip resulting from the FIB milling process illustrated in FIGS. 5A and 5B.

With the first ring 72 of tip stock material milled away, the probe can be usable for AFM imaging, with the distal end of the tip looking something like the portion illustrated schematically in FIG. 5C. At this point, the FIB source is still registered to the distal end 66 of tip stock 60, with the tip stock now having a smaller diameter, as illustrated by the broken lines in FIGS. 5A and 5B. The FIB source may be instructed to once again mill around the tip stock (similarly, in this case, in a ring 74) to ultimately produce a high aspect ratio tip 76 such as the portion of the tip shown schematically in FIG. 5D. Again, this FIB milling process is performed in a minimum of steps, in this case two (using two milling pattern masks), to produce a high aspect ratio tip 76 with very few process steps (compared to at least 20, and most often more than 50 milling pattern masks (or patterned sets of milling operations) using known FIB milling processes), and thus a minimum amount of complexity and time. In one embodiment, the tip extends at least about 2 μm from a top 63 of the stock base cone 62. Notably, a process having five, or even ten, milling steps will constitute a sharp reduction in time when compared to prior techniques.

In the end, using the preferred embodiments a tip extending from the stock may have a tip side wall angle greater than 75 degrees (corresponding to a half angle <15 degrees). Such high aspect ratio tips using only a silicon substrate (having known mechanical properties) are possible given the precise milling provided by the FIB source and the stock shaped as described (this is in contrast to other probe fabrication techniques that may be used to produce larger aspect ratio tips by growing different types of materials having less well-defined mechanical properties). In fact, probe tips have a half angle less than 10 degrees can be formed using the techniques defined herein.

Figure 8:
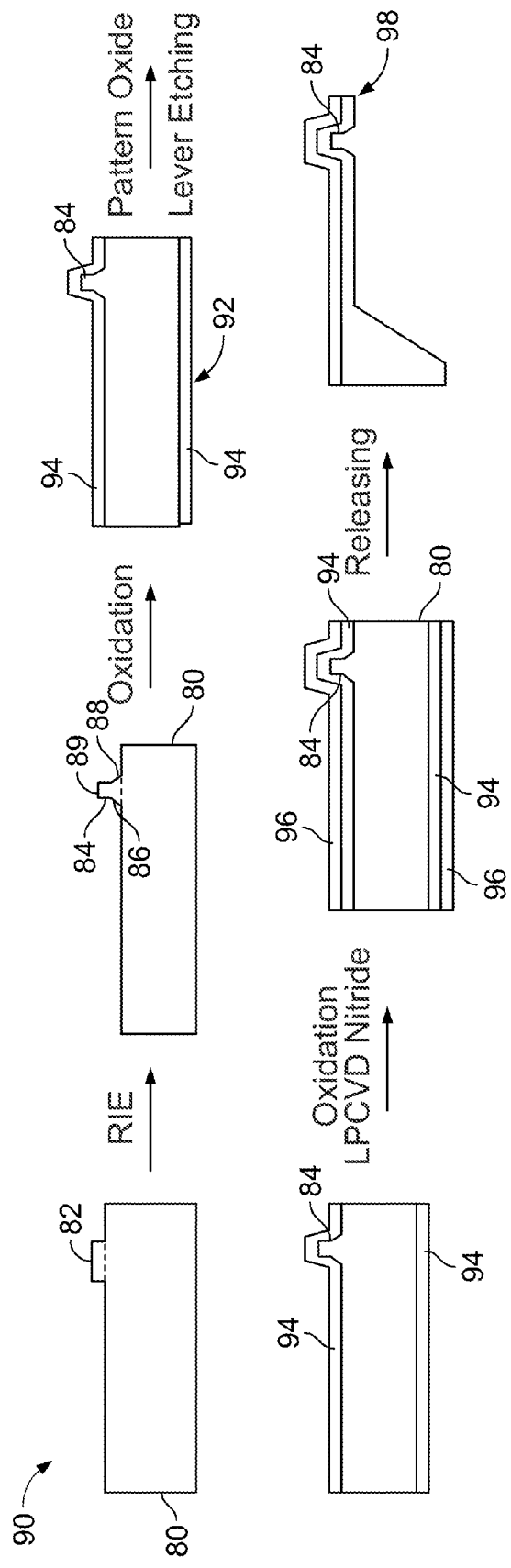
FIG. 8 is a process flow diagram illustrating the steps used to produce the tip stock shown in FIG. 6.

Most typically, the FIB milling of the probe tips is performed once the cantilever 52 and tip stock 60 are formed. Turning to FIG. 8, a lithographic process for forming the pedestal-shaped tip stock 60 according to the preferred embodiments is shown. Starting with a silicon wafer 80, a tip stock region 82 is patterned on wafer 80 (typically a plurality of tips for an array of about 350 to 450 probes to be produced with the wafer are patterned with an appropriate photoresist) in a first step. Then, using a reactive ion etching (RIE) process, a tip stock can be formed in a pedestal shape, for example, substantially corresponding to tip stock 60 shown in FIG. 4A. The reactive ion etching process is an anisotropic process in which the silicon is dry etched and sidewalls 86, 88 of tip stock 84 are substantially cone shaped to the silicon substrate. Once tip stock 84 is formed into a pedestal (e.g., a cylinder on a cone shape, shown schematically in FIG. 9 with a generally planar top 89), an oxidation step is performed on both the front 90 and back 92 sides of wafer 80 to protect the silicon tip stock 84. In particular, oxide 94 is patterned onto the front and back sides of wafer 80 to produce the cantilevers of the probe devices. Oxide is then stripped and re-grown and nitride 96 is then deposited onto the front and back sides 90, 92, respectively, of the wafer, with tip stock 84 still being protected by the patterned oxide 94 and nitride 96. The nitride 96 is typically deposited using a low pressure chemical vapor depositional (LPCVD) process and operates to allow the probe to survive exposure to the silicon etchant, KOH. The probe devices 98 are released by etching through the wafer in preparation for FIB milling. And finally the oxide and nitride films are stripped, with the integrity of tip stock 84 kept intact for such further processing.

Figure 6:
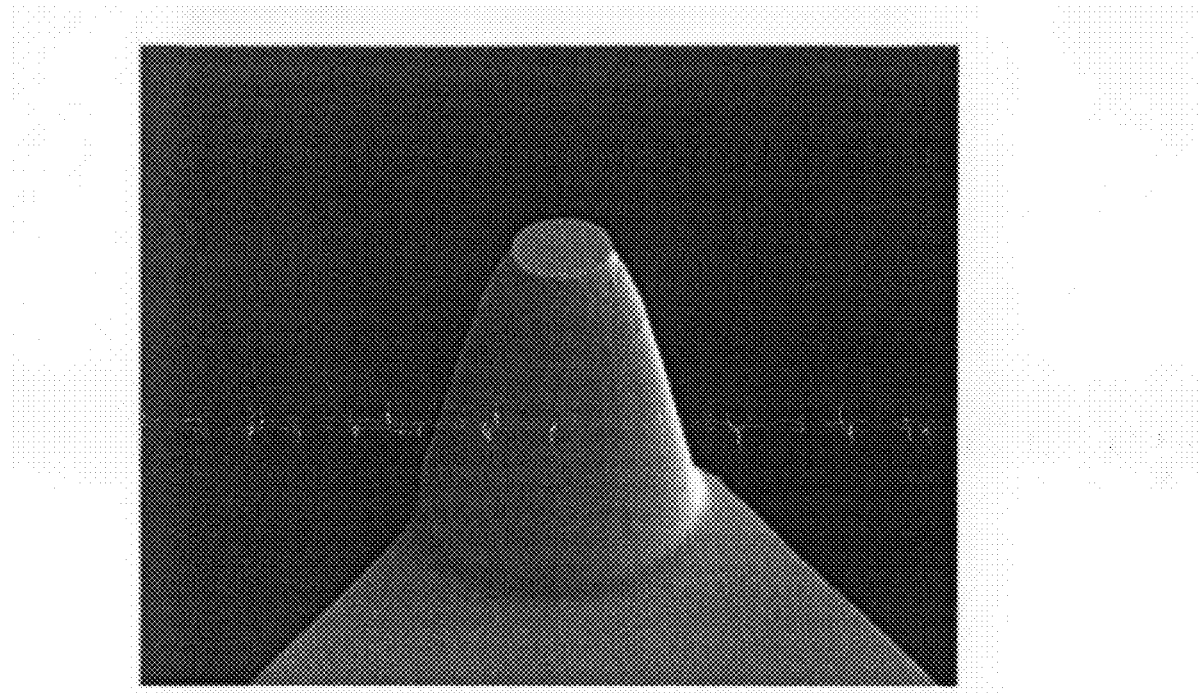
FIG. 6 is an image showing a tip stock according to a preferred embodiment.
Figure 9:
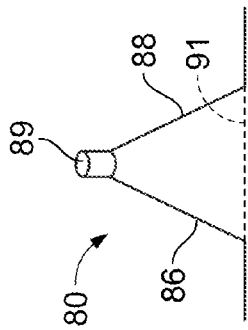
FIG. 9 is a schematic illustration of the tip stock shown in FIG. 6.
Figure 10:
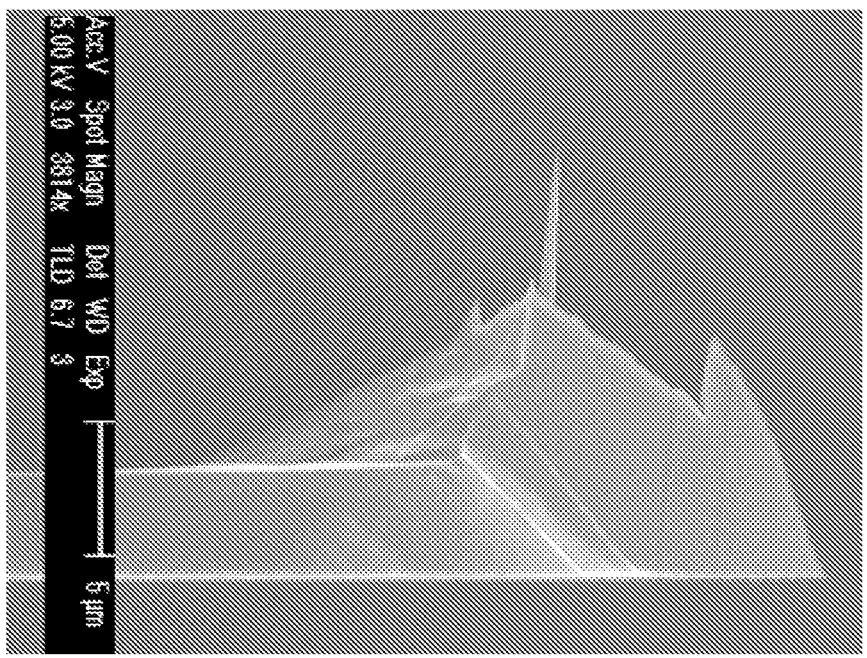
FIG. 10 is an image of a probe formed using a prior art FIB milling process, appropriately labeled "Prior Art".

Tip stocks such as that shown schematically in FIG. 9 (image in FIG. 6) are thereby produced. The height of pedestal 80 (i.e., the tip stock) from the back side is substantially uniform moving radially from an axis "X" of the pedestal, producing a substantially planar, substantially horizontal distal end 89. Notably, end 89 resides at a known distance from the back side of the stock wafer, which is also a reference plane in the FIB milling machine since it is coincident with the plane of the sample stage. Distal end 89 of tip stock 80 has a surface area large enough to be readily recognized using pattern recognition software (and in any event much easier than the apex of the complex pyramidal shape of the tip stock used in current FIB milling techniques). It is therefore a relatively ready process to register the FIB milling source 70 to the tip stock 84 (typically 2 seconds or less from the initiation of the search using pattern recognition software, and, hence, to mill away the tip stock to produce a high aspect ratio stylus of the resultant probe devices, as described above. In this way, machining substantially the entire distal end 66 of tip stock 84 (e.g., down to the base 91 of the stock) can be performed around the entire perimeter of the stock without having to conform to the slanted sidewalls of the pyramid shape. This is in direct contrast to the FIB milling performed in known systems (shown schematically in FIG. 3A) in which at most about 0.1 μm of tip height can be milled in one patterned step. Moreover, alignment between the FIB source and the distal end of the tip stock is not as critical as in known techniques because the height of the tip stock is a maximum and uniform over a greater area (i.e., the flat portion 89 of stock 84).

Figure 7:
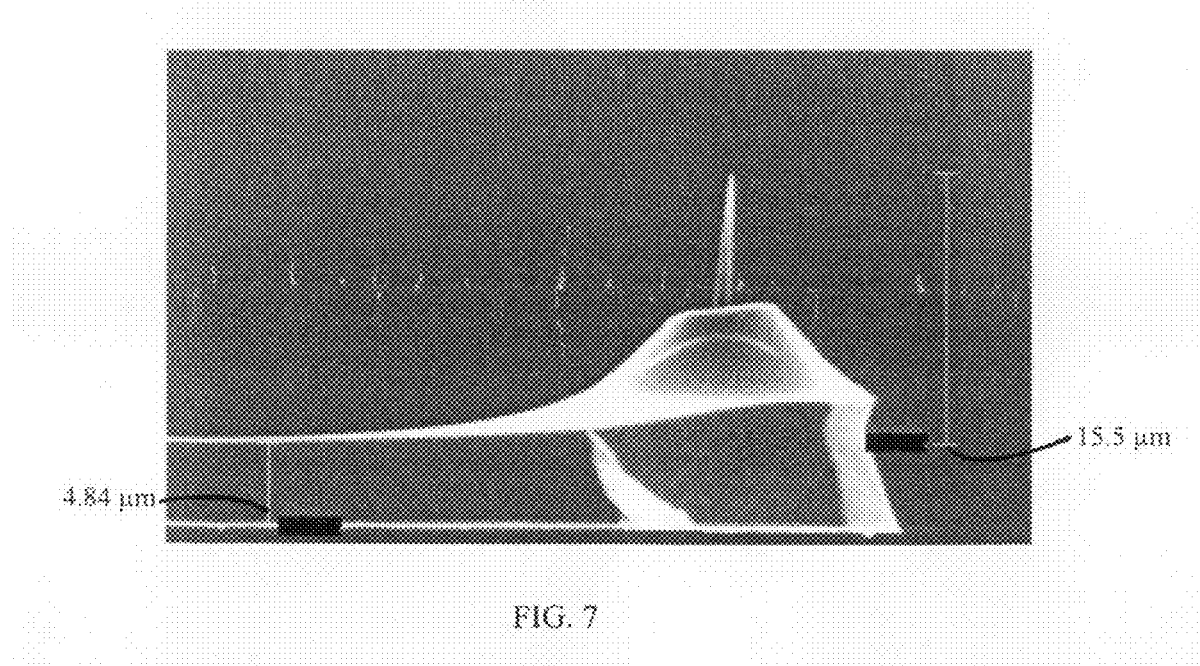
FIG. 7 is an image of a probe apex formed using an FIB milling process according to the preferred embodiments.

As a result, because less steps are performed and less stock requires milling, FIB tips can be produced in substantially less than the current 5 minutes required by known FIB milling techniques. In fact, they can be produced in 2 minutes, and even in 1 minute or less. With the two step milling process described above, tips having high aspect ratios (20 to 40, for instance—image in FIG. 7) can be produced in less than a minute.

In this way, probe tips of varying heights can be readily produced. Moreover, by forming the tip stock in this fashion, the high aspect ratio tip may be produced in a single FIB milling step. In this way, a minimum amount of tip stock material is required to be milled, thus minimizing the time it takes to produce the tip. In sum, while known FIB milling techniques typically machine a substantial volume, the preferred embodiments can produce high aspect ratio tips by milling a volume of tip stock material substantially less than prior techniques. As a result, each probe tip of the array of probes can be FIB machined in as much as five times less time than current techniques, with greater yield due to higher integrity alignment during FIB machining.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

We claim:

1. A method of producing an atomic force probe for a metrology instrument, the method comprising:
   providing a substrate;
   forming a flat cap stock extending upwardly from the substrate, the flat cap stock having a first cross section area to which an FIB beam is registered after it has been identified with pattern recognition software;
   FIB milling the flat cap stock downward toward the substrate along substantially the entire height of the tip stock to form a tip of the probe having a height that is at least about 500 nm and a second cross section area that is less than the first cross section area.

2. The method of claim 1, wherein the tip stock is a pedestal.

3. The method of claim 2, wherein a dimension of a cross-section of a distal end of the flat cap stock is consistent along the length of the distal end and is substantially the same as a dimension of a cross-section of a base of the pedestal.

4. The method of claim 3, wherein the width of the base is less than about 2 μm.

5. The method of claim 3, wherein the distal end is a known distance from the bottom of the substrate.

6. The method of claim 3, wherein at least the distal end of the pedestal is substantially cylindrical.

7. The method of claim 1, wherein the FIB milling step is completed in less than about 1 minute.

8. The method of claim 1, wherein the FIB milling step is completed using less than 20 milling pattern masks.

9. The method of claim 8, wherein the FIB milling step is completed using less than 3 milling pattern masks.

10. The method of claim 1, wherein the forming step is anisotropic.

11. The method of claim 1, wherein the forming step is performed using a reactive ion etch (RIE).

12. The method of claim 1, wherein the substrate is a silicon wafer.

13. The method of claim 1, wherein the metrology instrument is an AFM.

14. The method of claim 1, wherein the tip stock is non-pyramidal shaped.

15. The method of claim 1, wherein an aspect ratio of the tip is between 20 and 40.

16. A method of producing a probe for a metrology instrument, the method comprising:
   providing a substrate;
   forming a stock from the substrate, the stock having a volume less than about 100 m3
   having a first cross section area to which an FIB beam is registered after it has been identified with pattern recognition software; and
   FIB milling the stock reducing the stock volume along substantially the entire height of the tip stock to form a tip of the metrology instrument, the tip having a second cross section area that is less than the first cross section area.

17. A method of producing a probe for a metrology instrument, the method comprising:
   providing a substrate;
   forming a stock having a substantially flat distal end and a first cross section area to which an FIB beam is registered after identifying a distal end of the tip stock with a pattern recognition algorithm; and
   FIB milling the tip stock in a proximal direction along substantially the entire height of the tip stock into an SPM tip having a second cross section area that is less than the first cross section area.

18. The method of claim 17, wherein the FIB milling step mills the stock into an SPM tip using less than about 50 milling pattern masks.

19. The method of claim 18, wherein the milling step is completed in less than 3 milling pattern masks.

20. The method of claim 17, the method comprising tilting at least one of the probe device and an FIB source used in the FIB milling step to accommodate mounting the probe at an angle relative to the sample surface so that the probe tip extends substantially orthogonally relative to the sample surface when mounted for imaging.

21. A probe device for a metrology instrument comprising:
   a substrate;
   a cantilever extending from the substrate and having a substantially free end; and
   a tip extending substantially orthogonally from about the free end and being formed from a stock having an end cross-sectional shape to which an FIB beam is registered after it is identified by a pattern recognition algorithm within 2 seconds.

22. The probe of claim 21, wherein the tip extends substantially orthogonally from about the free end at least about 500 nm and has a tip base having a cross sectional dimension less than about 10 μm.

23. The probe device of claim 21, wherein the tip is foliated to extend from the stock which is a stock base cone, and wherein the tip extends at least about 2 μm from a top of the stock base cone.

24. The probe device of claim 21, wherein an aspect ratio of the tip is between about 20 and 30.

* * * * *